US010801833B2

(12) United States Patent
Georgeson et al.

(10) Patent No.: US 10,801,833 B2
(45) Date of Patent: Oct. 13, 2020

(54) STRAIN SENSITIVE SURFACES FOR AIRCRAFT STRUCTURAL ANALYSIS AND HEALTH MONITORING

(71) Applicant: The Boeing Company, Chicago, IL (US)

(72) Inventors: Gary E. Georgeson, Tacoma, WA (US); Kenneth H. Griess, Kent, WA (US); Russell L. Keller, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 15/948,582

(22) Filed: Apr. 9, 2018

(65) Prior Publication Data

US 2019/0310076 A1 Oct. 10, 2019

(51) Int. Cl.
*G01B 11/16* (2006.01)
*G01M 5/00* (2006.01)
*G01L 1/24* (2006.01)

(52) U.S. Cl.
CPC ............ *G01B 11/16* (2013.01); *G01B 11/165* (2013.01); *G01L 1/246* (2013.01); *G01M 5/0016* (2013.01); *G01M 5/0091* (2013.01)

(58) Field of Classification Search
CPC ..................................................... G01B 11/16
USPC ............................................................ 356/32
See application file for complete search history.

(56) References Cited

U.S. PATENT DOCUMENTS

| 4,322,162 A | 3/1982 | McKelvie et al. |
| 4,874,941 A | 10/1989 | Spillman, Jr. |
| 4,939,368 A * | 7/1990 | Brown ................. G01B 11/165 250/231.1 |
| 5,399,854 A * | 3/1995 | Dunphy .................. G01K 5/72 250/227.17 |

(Continued)

FOREIGN PATENT DOCUMENTS

CN 106840012 A 6/2017

OTHER PUBLICATIONS

Search Report for related European Application No. EP19157628.9; report dated Sep. 12, 2019.

(Continued)

*Primary Examiner* — Tarifur R Chowdhury
*Assistant Examiner* — Omar H Nixon
(74) *Attorney, Agent, or Firm* — Miller, Matthias & Hull LLP (57) ABSTRACT

Systems and methods for assessing strain in structural components are disclosed. Structural component may have geometric patterns of grooves, with the grooves in the geometric pattern each having a groove width. The method may include illuminating the geometric pattern of grooves with a first light at a first wavelength that corresponds to the groove width to create diffraction when the first light hits the geometric pattern of grooves and corresponding changes in the wavelength of the light reflected from the geometric pattern of grooves indicating changes in the groove widths due to strain caused when the structural component is exposed to environmental conditions, detecting the wavelength of the light reflected from the geometric pattern of grooves, and correlating the detected wavelength of the light reflected from the geometric pattern of grooves to the strain in the structural components.

20 Claims, 5 Drawing Sheets

(56) References Cited

U.S. PATENT DOCUMENTS

| | | | |
|---|---|---|---|
| 5,430,817 A * | 7/1995 | Vengsarkar | G02B 6/02095 385/37 |
| 5,760,391 A * | 6/1998 | Narendran | G01D 5/35383 250/227.14 |
| 6,584,857 B1 | 7/2003 | Furlani et al. | |
| 2002/0037135 A1 * | 3/2002 | Atieh | G01M 11/00 385/37 |
| 2003/0026190 A1 * | 2/2003 | Hendriks | G02B 7/008 369/112.28 |
| 2003/0142319 A1 * | 7/2003 | Ronnekleiv | G01D 5/35303 356/477 |
| 2006/0071158 A1 * | 4/2006 | Van Der Spek | E21B 47/01 250/227.14 |
| 2008/0151219 A1 * | 6/2008 | Maris | G01B 11/02 356/33 |
| 2011/0226070 A1 * | 9/2011 | Berendes | G01L 5/0085 73/862.55 |
| 2011/0316712 A1 | 12/2011 | McIver et al. | |
| 2012/0325009 A1 * | 12/2012 | Chung | G01B 15/06 73/768 |
| 2014/0098028 A1 * | 4/2014 | Kwak | G09G 5/00 345/173 |
| 2015/0308907 A1 | 10/2015 | Georgeson et al. | |
| 2016/0249809 A1 * | 9/2016 | Ou-Yang | A61B 1/00186 600/477 |
| 2017/0052152 A1 | 2/2017 | Tat et al. | |
| 2017/0059890 A1 | 3/2017 | Wilson | |
| 2017/0276614 A1 | 9/2017 | Bovero et al. | |
| 2018/0038744 A1 | 2/2018 | Winter et al. | |

OTHER PUBLICATIONS

Office Action for related Singapore Application No. 10201903121T; report dated Mar. 12, 2020.

* cited by examiner

STRAIN SENSITIVE SURFACES FOR AIRCRAFT STRUCTURAL ANALYSIS AND HEALTH MONITORING

TECHNICAL FIELD

The present disclosure relates generally to non-destructive inspection (NDI) of structural components and, more particularly, to systems and methods for detecting strain in structural components caused by exposure to environmental conditions utilizing geometric patterns of grooves on the structural components that diffract nonvisible light to produce detectable variations in the wavelength of light reflected from the grooves, such as detectable optical responses in the reflected light in the form of color changes, indicating strains in the structural components.

BACKGROUND

Many mechanical systems, such as commercial vehicles, manufacturing equipment, and other industrial systems, may be exposed to particularly energetic environmental conditions, such as vibration, temperature extremes, impacts and mechanical stresses. For example, even when on the ground, aircraft may be exposed to significant stresses during cargo loading and unloading, as well as impacts from support vehicles and ground support equipment. During flight, stresses and/or impacts may result during take-off and landing, from shifting or improperly secured cargo, from impacts with objects during flight, and the like. In addition, some structural components may experience thermal stresses when exposed to high temperatures. For example, some composite materials may be affected by thermal degradation, which may compromise the mechanical properties of the composite, including flexural strength, compression after impact, and inter-laminar shear strength, among others.

It is therefore common for selected components of various industrial systems to be routinely inspected and evaluated during the operational lifetime of the component. The integrity of one or more structural components may be compromised without an accompanying visually detectable indication of the effect of environmental conditions on the components. Accordingly, needs exist for non-destructive inspection techniques that can indicate cumulative effects on structural components after being exposed to environmental conditions such as repetitive loading, impacts, high temperatures and the like during operation. Such indications may lead to the scheduling of further evaluation, maintenance and/or replacement of the structural components at appropriate times.

SUMMARY OF THE DISCLOSURE

In one aspect of the present disclosure, a method for assessing strain in a structural component is disclosed. The method may include creating a geometric pattern of grooves on the structural component having a first set of grooves each having a first groove width, and illuminating the geometric pattern of grooves with a first light at a first wavelength that corresponds to the first groove width to create diffraction when the first light hits the geometric pattern of grooves and corresponding changes in a wavelength of light reflected from the geometric pattern of grooves indicating changes in the first groove width due to strain caused when the structural component is exposed to environmental conditions. The method may further include detecting the wavelength of the light reflected from the geometric pattern of grooves as the first light illuminates the geometric pattern of grooves, and correlating the detected wavelength of the light reflected from the geometric pattern of grooves to the strain in the structural component.

In another aspect of the present invention, an inspection system for assessing strain in a structural component is disclosed. The inspection system may include a geometric pattern of grooves on the structural component having a first set of grooves each having a first groove width, a first illumination source projecting a first light at a first wavelength that corresponds to the first groove width to create diffraction when the first light hits the geometric pattern of grooves and corresponding changes in wavelength of the light reflected from the geometric pattern of grooves indicating changes in the first groove width due to strain caused when the structural component exposed to environmental conditions, and a detector detecting the wavelength of the light reflected from the geometric pattern of grooves as the first illumination source illuminates the geometric pattern of grooves. The inspection system may further include a processor operatively connected to the detector and configured to receive the detected wavelength of the light from the detector and to correlate the detected wavelength of the light from the geometric pattern of grooves to the strain in the structural component.

In a further aspect of the present disclosure, a method for assessing strain in a structural component is disclosed. The structural component may have a geometric pattern of grooves on the structural component, and the geometric pattern of grooves having a first set of grooves each having a first groove width. The method may include illuminating the geometric pattern of grooves with a first light at a first wavelength that corresponds to the first groove width to create diffraction when the first light hits the geometric pattern of grooves and corresponding changes in the wavelength of the light reflected from the geometric pattern of grooves indicating changes in the first groove width due to strain caused when the structural component is exposed to environmental conditions, detecting the wavelength of the light reflected from the geometric pattern of grooves as the first light illuminates the geometric pattern of grooves, and correlating the detected wavelength of the light reflected from the geometric pattern of grooves to the strain in the structural component.

Additional aspects are defined by the claims of this patent.

DETAILED DESCRIPTION

Figure 1:
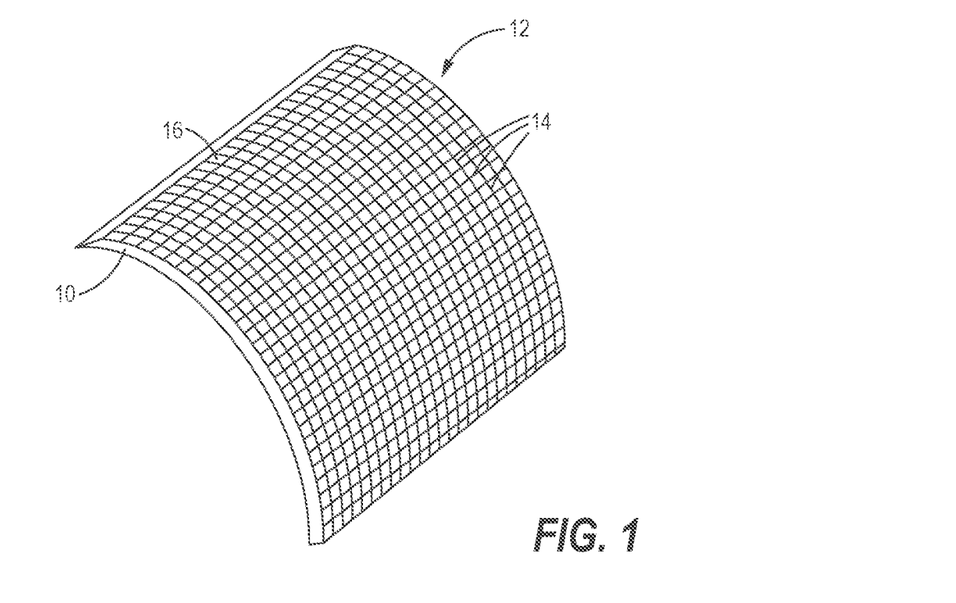
FIG. 1 is an isometric view of a structural component of a mechanical system having a geometric pattern of grooves in accordance with the present disclosure.

FIG. 1 is an illustration of a portion of a structural component 10 of a mechanical system that is configured for application of the NDI systems and methods illustrated and described herein. The structural component 10 may be any component of a mechanical system that will be subjected to environmental conditions that can cause stresses and strains to the structural component 10. For use in the NDI systems and methods of the present disclosure, structural component 10 includes a geometric pattern 12 of grooves 14 formed on a surface 16 of the structural component 10, or within the structural component 10 as described below.

The grooves 14 and the geometric pattern 12 are configured to create strain-sensitive detectable variations in the wavelength of light reflected from the grooves 14 of the geometric pattern 12 in response to being illuminated by light outside the visible spectrum. The detectable variations in the wavelength of the reflected light can include detectable optical responses in the form of color changes from colors in the reflected light prior to the structural component 10 begin exposed to environmental conditions. By avoiding the visible spectrum, the strains will only be visible under infrared or ultraviolet light depending on the configuration, and will not be observable by the casual observer. In the illustrated embodiment, the grooves 14 are arranged with a groove width WG (FIG. 3) to create diffraction when illuminated by a light having a corresponding wavelength outside the visible range of approximately 400 nm to 750 nm. The diffraction of the applied light creates the detectable variations in the wavelength of the reflected light such as the detectable optical response in the form of colors that vary as the groove width WG changes due to strain in the structural component 10.

The groove width WG will determine an optimum spectral range that can be applied to the geometric pattern 12. In general, the geometric pattern 12 will not diffract a wavelength greater than two times the groove width WG. An example of combinations of wavelengths and groove widths WG that can be used in the system and methods of the present disclosure is as follows:

| Light Type | Wavelength | Groove Width WG |
| --- | --- | --- |
| Ultraviolet | 200 nm-400 nm | 100 nm-200 nm |
| Near Infrared | 750 nm-2,500 nm | 375 nm-1,250 |
| Mid Infrared | 2,500 nm-50,000 nm | 1,250 nm-25,000 nm |

In implementations where color changes are used as the strain-sensitive detectable variations in the wavelength of the reflected light, the wavelength/groove width WG can be selected such that the geometric pattern 12 will reflect a blue color when illuminated and the structural component 10 is not subjected to strain causing the groove width WG to increase. As a structural component 10 is subjected to environmental conditions causing strain, the reflected color from the geometric pattern 12 will progress through the spectrum toward red as the string causes the groove widths WG to increase. Depending on the configuration of the structural component 10, the geometric pattern 12 and the environmental conditions to which the structural component 10 is exposed, groove width change and corresponding color change may be uniform across the geometric pattern 12, or can be greater in some areas indicating greater stress and strain concentrations in those areas. An amount of strain and corresponding changing groove width WG and color may be acceptable without the need for further inspection, while greater changes may indicate a need for further inspection, maintenance and/or replacement of the structural component 10. Those skilled in the art will understand that the initial groove width WG and the wavelength may be selected such that groove width WG does not increase beyond two times the wavelength before the structural component 10 experiences strain meriting further inspection.

Figure 1A:
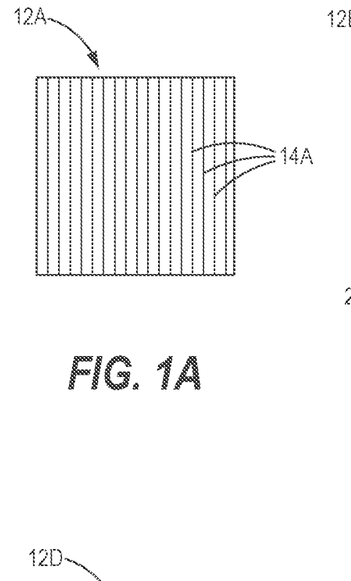
FIGS. 1A-1G are plan views of embodiments of geometric patterns of grooves in accordance with the present disclosure for the structural component of FIG. 1.

An appropriate geometric pattern 12 for the structural component 10 may be dictated by the characteristics of the structural component 10, the environmental conditions anticipated to be encountered by the structural component 10, development testing results, experience with the structural component 10 in the field and other factors. FIGS. 1A-1F provide several examples of geometric patterns 12A-12F that may be created in or on the structural component 10 as appropriate. FIG. 1A illustrates an exemplary one-dimensional geometric pattern 12A formed by a series of parallel linear grooves 14A. The linear geometric pattern 12A may be appropriate for a cylindrical structural component such as a pipe (not shown) that may be subjected to circumferential or hoop stresses, but minimal stresses in an axial direction. The geometric pattern 12A may wrap around the cylindrical structural component with the grooves 14A aligned parallel to a longitudinal axis of the structural components such that strain due to hoop stresses will increase the circumferential groove width WG between the grooves 14A.

Figures 1B, 1C, 1E, 1F:
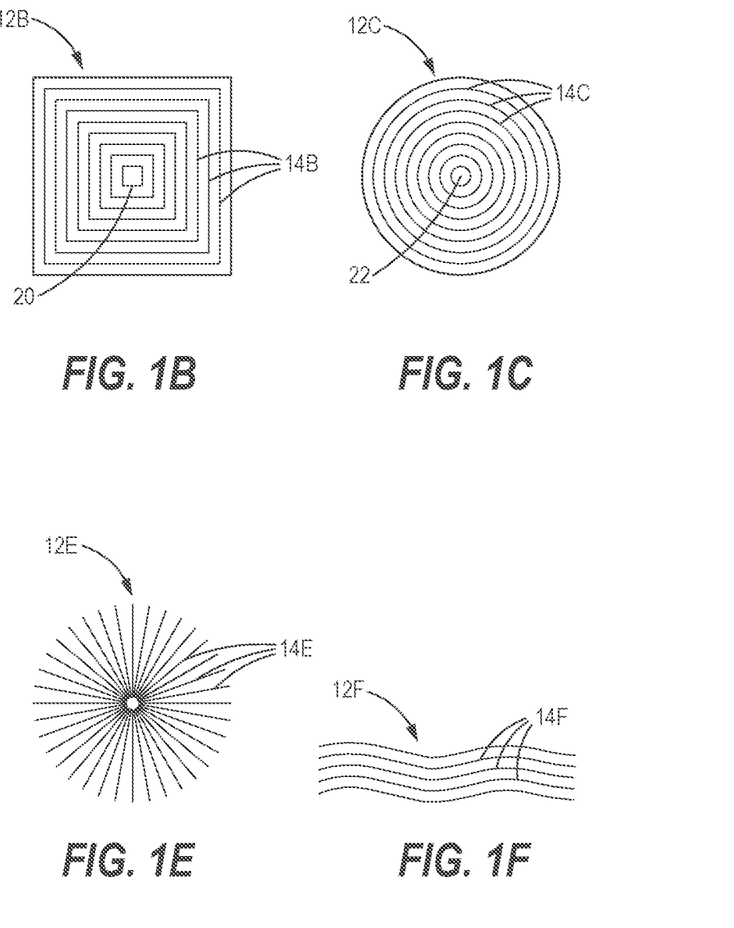
Figure 1D:
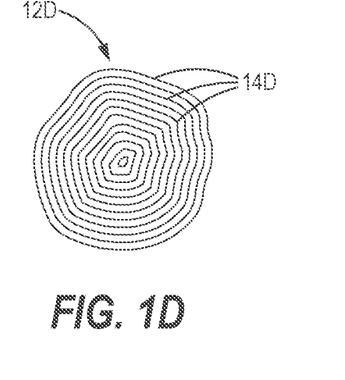

FIG. 1B illustrates an example of a two-dimensional geometric pattern 12B formed by a plurality of square or rectangular grooves 14B. The square or rectangular grooves 14B defined increasing areas, and are arranged concentrically to form the geometric pattern 12B. The rectangular geometric pattern 12B may have use, for example, in a structural component 10 having a rectangular opening 20 passing there through. FIG. 1C illustrates an alternative two-dimensional geometric pattern 12C formed by a plurality of concentric circular grooves 14C defining increasing areas. The circular geometric pattern 12C may have application in a structural component 10 where stress on the structural component 10 may be directed radially outward from a point at the center of the geometric pattern 12C. FIG. 1D illustrates a further example of a geometric pattern 12D having concentric grooves 14D with a more complex geometric shape that may correspond to a shape of an opening or other component extending from the structural component 10. Additional irregular shapes are contemplated based on the needs of a particular implementation in the structural component 10.

FIG. 1E illustrates a further alternative two-dimensional geometric pattern 12E having a plurality of grooves 14E extending radially outward from a central point 22. The geometric pattern 12E may be an alternative to the geometric pattern 12C where circumferential stresses are more prevalent than radial stresses. FIG. 1F illustrates a geometric pattern 12F formed by a plurality of parallel curved grooves 14F. The curved grooves 14F may follow a contour of a component having a curved shape extending through the structural component 10 such as an aircraft wing.

Figure 1G:
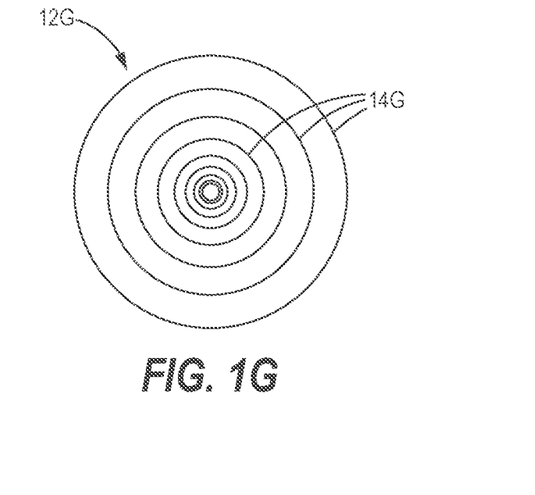

In some implementations, the structural component 10 may have areas of interest where it may be desirable to have greater sensitivity to strain and changes in the groove width WG. In such situations, areas of interest may be distinguished by varying the spacing between the grooves 14, the groove width WG and the wavelength across the structural component 10. FIG. 1G illustrates a geometric pattern 12G that is a modification of the circular geometric pattern 12C of FIG. 1C wherein a groove spacing distance DG (FIG. 3) between adjacent grooves 14G increases as the geometric pattern 12G extends outward from the center where it may be more critical to closely inspect the radial stresses. The area with the smaller groove spacing distance DG and correspondingly higher concentration of grooves 14G may be more sensitive to strain and changes in the groove width WG and produce a more intense response in the wavelength of the reflected light to the projected light in the area of interest than at the area with greater groove spacing distance DG and spaced out remote grooves 14G.

As another alternative that may provide a smarter strain indicator, the geometric pattern 12 may have sets of grooves 14 laid down at angles to each other with different groove widths WG to independently monitor different levels or types of strain occurring in the structural component 10. For example, the geometric patterns 12C, 12E may be implemented into a single geometric pattern 12 on the structural component 10. The circular geometric pattern 12C may be created with the groove width WG being within the range responsive to infrared light and the geometric pattern 12E created overlying the geometric pattern 12C with the groove width WG being within the range responsive to mid ultraviolet light. During inspection, the radial strains can be interrogated by illuminating the structural component 10 with the infrared light, and the circumferential strain can be interrogated by illuminating the structural component 10 with the mid ultraviolet light. Alternative or additional geometric patterns 12 such as those illustrated and described herein can further be created on the structural component 10 with varying groove widths WG and corresponding light wavelengths to inspect for additional strain patterns as necessary in a particular implementation.

Figures 2, 3:
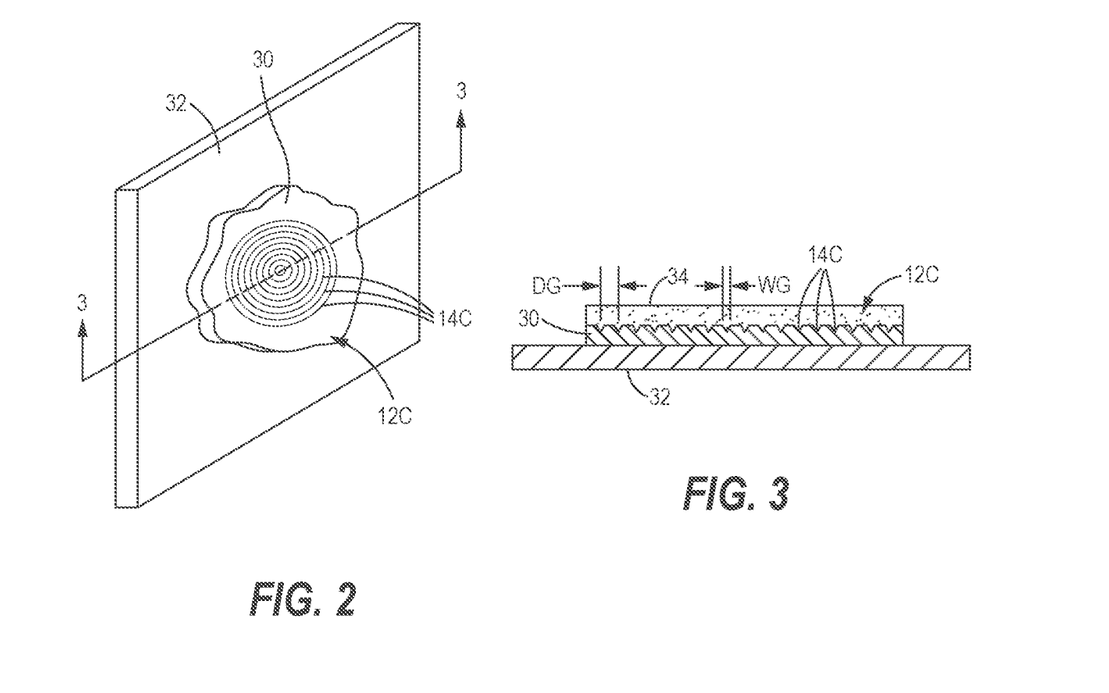
FIG. 2 is an isometric view of a portion of a mechanical system with a patch installed thereon having a geometric pattern of grooves in accordance with the present disclosure.
FIG. 3 is a cross-sectional view of the portion of the mechanical system and the patch taken through line 3-3 of FIG. 2.

FIG. 2 illustrates an implementation where the structural component is a patch 30 applied over a damaged area of another structural component 32. The patch 30 is appropriately shaped to cover the damaged area, and is affixed to the structural component 32 via rivets, welds, adhesive, lamination or other appropriate attachment means. The patch 30 includes, for example, the geometric pattern 12C of FIG. 1C. After the patch 30 is installed, it may be inspected according to the systems and methods disclosed herein. In addition to detecting strains in the patch 30, the inspection may provide evaluation of the integrity of the application of the patch 30 to the structural component 32. If the patch 30 is properly applied and attached to the structural component 32, stresses in the structural component 32 will be transmitted to the patch 30 and corresponding strain will appear during the inspection. If the patch 30 is not properly applied and conditions such as delamination are present, the stresses may not be transferred and the inspection of the patch 30 will reveal less strain in the patch 30 than expected. Such results may prompt further investigation and reapplication of the patch 30 over the damaged area.

FIG. 3 illustrates a cross-section of the structural component 32 with the patch 30 applied and of the geometric pattern 12C formed in an outer surface of the patch 30. The grooves 14C may have the groove width WG determined based on the wavelength of the light to be used during an inspection, and the groove spacing distance DG between centers of the grooves 14C determined to achieve a desired intensity of response to the inspection light. The grooves 14C could also be created in the structural component 32. Depending on the application, it may not be desirable for the mechanical system to have the geometric pattern 12C exposed. As shown, the external surface of the patch 30 may be covered by a layer of material 34, such as a coating of resin that may fill in the grooves 14C. An appropriate material may be chosen for the layer of material 34 that would be penetrated by the ultraviolet or infrared light that will illuminate the geometric pattern 12C. Such material will appear invisible to the projected light so that the optical response of the geometric pattern 12C will be detectable through the layer of material 34.

Figure 4:
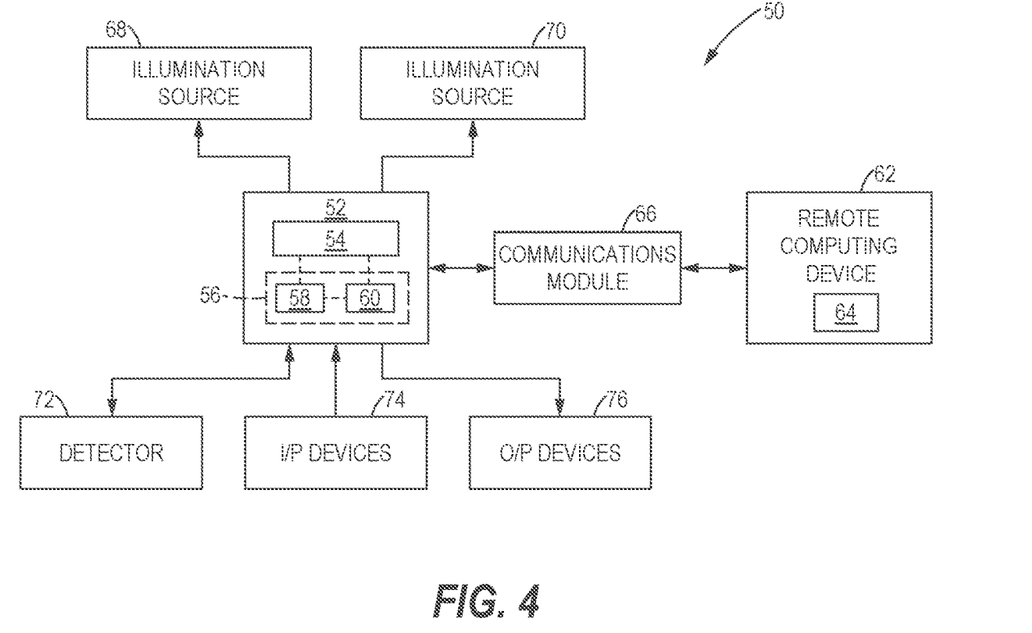
FIG. 4 is a block diagram of electrical and control components that may implement structural component inspection in accordance with the present disclosure.

The geometric patterns 12 illustrated and described herein may be incorporated into an inspection system 50 for assessing strain in the structural component 10. FIG. 4 illustrates an exemplary arrangement of electrical and control components that may be integrated in the inspection system 50 in accordance with the present disclosure. The controller 52 may be capable of processing information received from monitoring and control devices using software stored at the controller 52, and outputting command and control signals to devices of the inspection system 50. The controller 52 may include a processor 54 for executing a specified program, which controls and monitors various functions associated with the inspection system 50. The processor 54 may be operatively connected to a memory 56 that may have a read only memory (ROM) 58 for storing programs, and a random access memory (RAM) 60 serving as a working memory area for use in executing a program stored in the ROM 58. Although the processor 54 is shown, it is also possible and contemplated to use other electronic components such as a microcontroller, an application specific integrated circuit (ASIC) chip, or any other integrated circuit device.

While the discussion provided herein relates to the functionality of the inspection system 50, the controller 52 may be configured to control other aspects of operation of other systems. Moreover, the controller 52 may refer collectively to multiple control and processing devices across which the functionality of the inspection system 50 and other systems may be distributed. For example, portions of the functionality of the inspection system 50 may be performed at a remote computing device 62 having a controller 64 that is operatively connected to the controller 52 by a communications module 66 of the inspection system 50. The remote computing device 62 may be located in the centralized location for an enterprise utilizing the inspection system 50 to perform inspections on mechanical systems. The controllers 52, 64 may be operatively connected to exchange information as necessary to control the operation of the inspection system 50. Other variations in consolidating and distributing the processing of the controllers 52, 64 as described herein are contemplated as having use in inspection systems 50 in accordance with the present disclosure.

The inspection system 50 may further include one or more illumination sources 68, 70 capable of projecting light at predetermined wavelengths corresponding to the groove width WG of the grooves 14 and the geometric pattern 12. The illumination sources 68, 70 may receive illumination control signals from the processor 54 causing the illumination sources 68, 70 to project light. In some embodiments, each illumination source 68, 70 may be capable of projecting light at one wavelength. In alternative embodiments, each illumination source 68, 70 or a single illumination source may be capable of projecting light at different wavelengths. While the illumination sources 68, 70 are illustrated and described as being operatively connected to the processor 54, those skilled in the art will understand that the illumination sources 68, 70 may be standalone devices having associated input devices such as on/off switches, wavelength selection inputs and the like for manual control of the operation by personnel performing an inspection.

The inspection system 50 also may include a detector 72 operatively connected to the processor 54. The detector 72 may be any device capable of detecting the wavelength of the light reflected from the geometric pattern 12 when illuminated by the illumination sources 68, 70. In the embodiments illustrated herein, the detector 72 may be an optical detector capable of detecting the wavelength of the reflected light as an optical response such as colors reflected by the geometric pattern 12. For example, the detector 72 may be a charge-coupled device (CCD) camera, a video camera, photographic film or other light-sensing apparatus. When activated by the processor 54 or manually actuated by appropriate input devices, the detector 72 can capture the reflected light and transmit a representation of the detected wavelengths of the reflected lights to the processor 54. Once received, the processor 54 may store the detected wavelengths in the memory 56. While the embodiments illustrated and described hereinafter utilize changes in color as the detectable variations in wavelength of the reflected light used for strain sensing in the systems and methods of the present disclosure, the use of colors is merely exemplary. Those skilled in the art will understand that detection of the wavelengths or frequencies of the reflected light and determinations of variations in the wavelengths or frequencies may be achieved using alternative mechanisms as desired or necessitated by a particular implementation of the systems and methods described herein, and the use such alternative mechanisms is contemplated by the inventors. Color and color changes are used in the following discussion for simplicity and clarity, and it should be understood that use of any other mechanisms for detection and analysis of the wavelengths of the reflected light has equal application in the systems and methods of the present disclosure.

The inspection system 50 may have one or more input devices 74 adjustable by an operator to control the inspection process. The input device 74 can include switches, buttons, keyboards, mice, touchscreens and the like capable of receiving input commands from an operator. Output devices 76, such as monitors, screens, touchscreens, speakers, printers and the like may convey information from the inspection system 50 to the operator.

Figure 5:
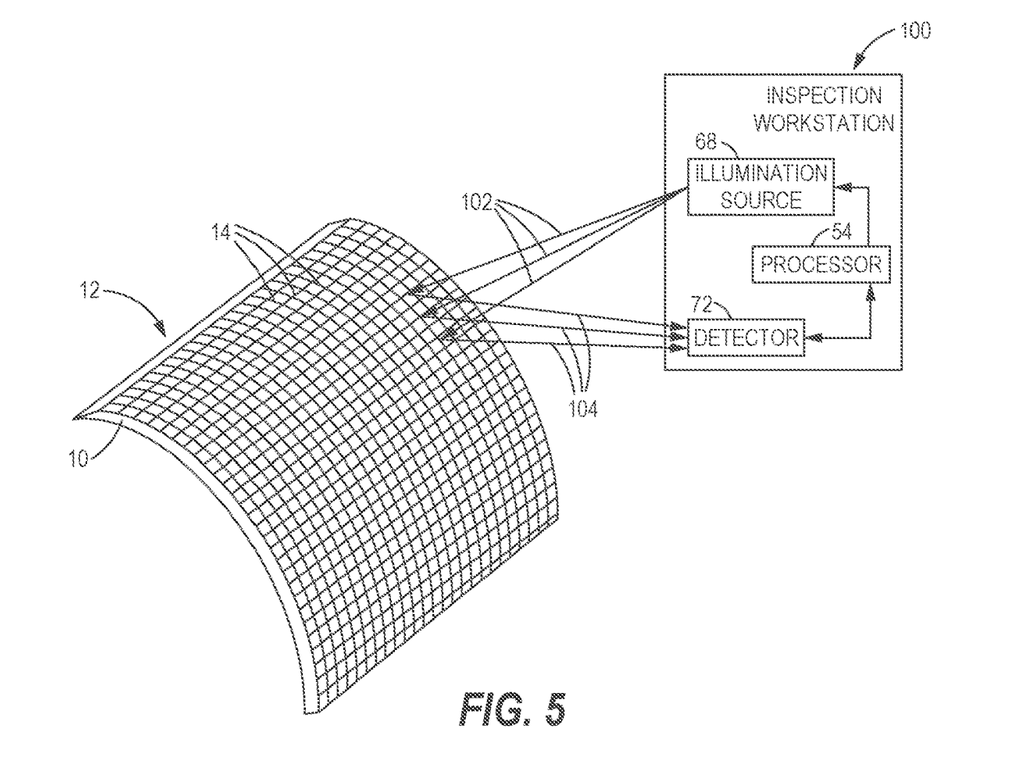
FIG. 5 is a schematic illustration of an exemplary implementation of an inspection system and inspection method in accordance with the present disclosure on the structural component of FIG. 1.

An exemplary implementation of the inspection system 50 is illustrated in FIG. 5. The processor 54, the illumination source 68 and the detector 72 are integrated in an inspection workstation 100. The inspection workstation 100 may be, for example, a workstation at a maintenance facility for the mechanical system of which the structural component 10 is a part. With the structural component 10 disposed at the inspection workstation 100, the illumination source 68 may be activated to project light 102 at the appropriate wavelength onto the geometric pattern 12. The projected light 102 is diffracted and reflected by the geometric pattern 12 to produce reflected light 104. The detector 72 receives and detects the reflected light 104, and transmits the detected reflected light 104 to the processor 54 for analysis and correlation of the detected wavelengths or frequencies of the reflected light 104 into corresponding strain values. The processor 54 may be programmed with algorithms known in the art for performing the conversion of the detected wavelengths or frequencies into strain values.

Figure 6:
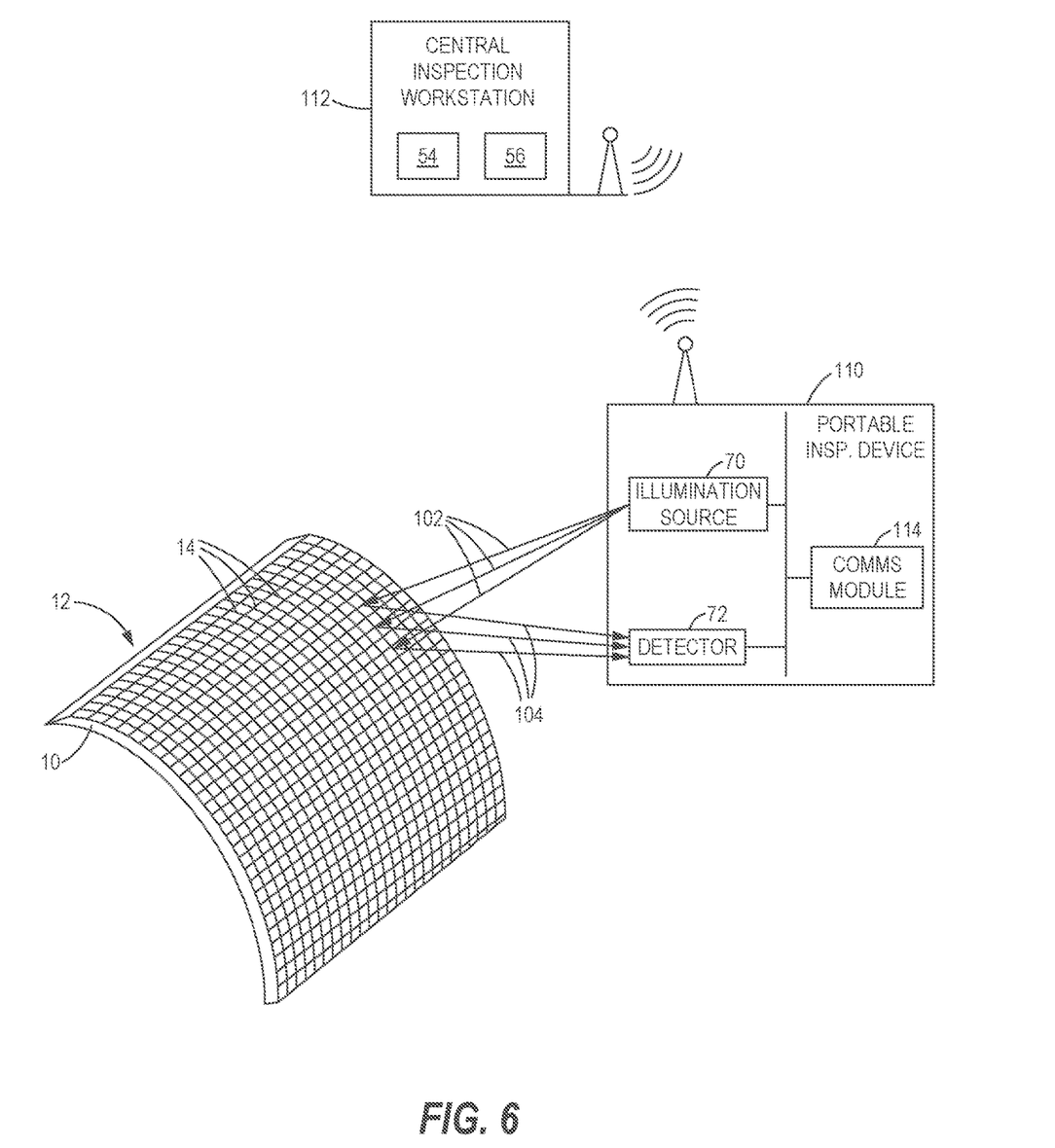
FIG. 6 is a schematic illustration of an alternative exemplary implementation of the inspection system and inspection method on the structural component of FIG. 1.

FIG. 6 illustrates an alternative implementation of the inspection system 50 where the illumination source 68 and the detector 72 are components of a portable inspection device 110 and the processor 54 and the memory 56 are located at a central inspection workstation 112. The portable inspection device 110 may be a laptop computer, a tablet, a smart phone, a personal digital assistant or other portable processing device. The portable inspection device 110 may further include a communications module 114 capable of wireless communications with the communications module 66 at the central inspection workstation to transmit the detected colors from the detector 72.

Figure 7:
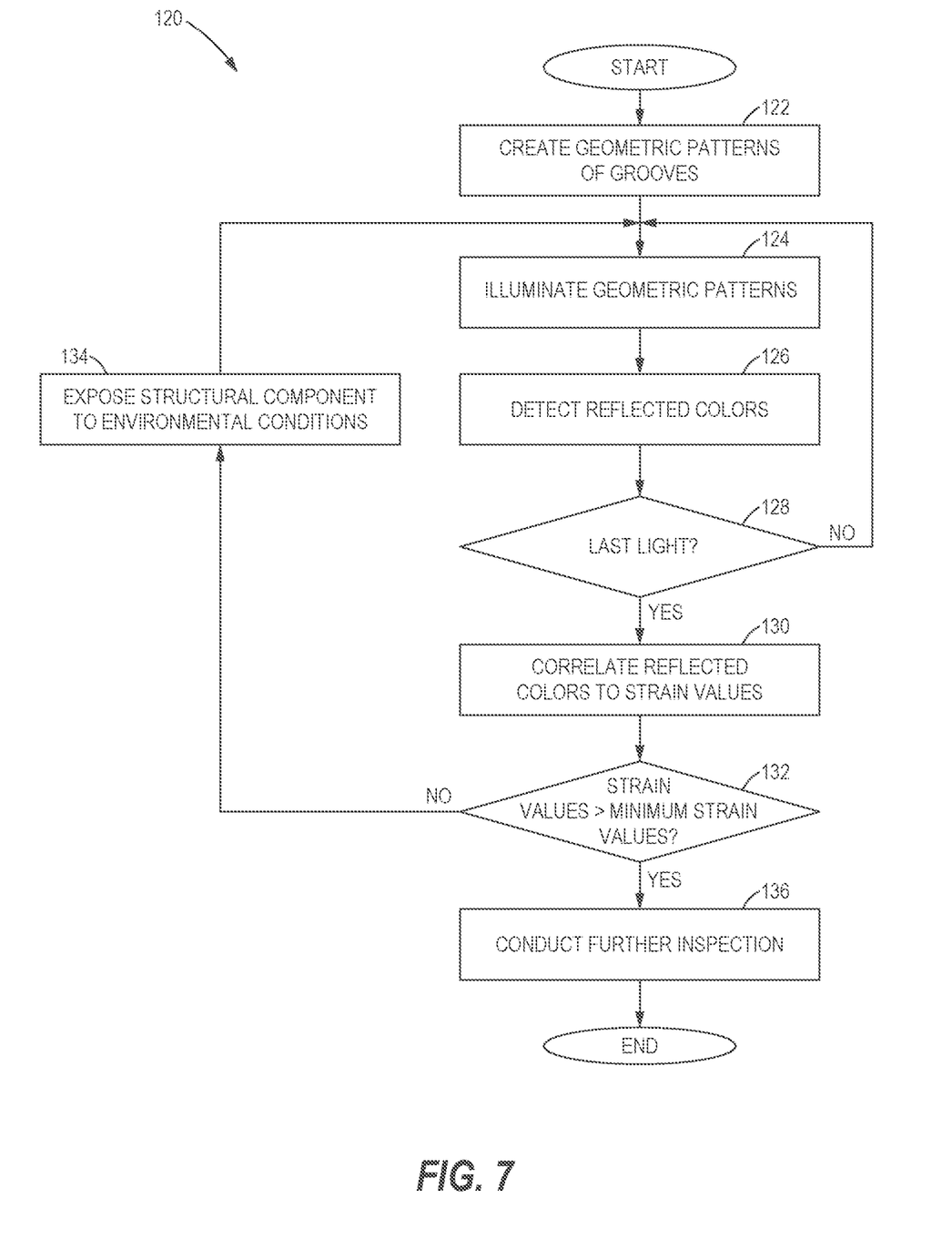
FIG. 7 is a flow diagram of an embodiment of an inspection routine in accordance with the present disclosure.

FIG. 7 illustrates an exemplary inspection routine 120 that may be performed on the structural component 10 by the inspection system 50. The routine 120 may begin at a block 122 where one or more of the geometric patterns 12, 12A-12G of grooves 14, 14A-14G is or are created on the structural component 10. The grooves 14, 14A-14G may be formed in these structural component 10 using any appropriate manufacturing technique. For example, the grooves 14, 14A-14G may be etched into a surface of the structural component 10. In composite components, the grooves 14, 14A-14G may be formed in an outer layer and then covered and filled by resin that will be transparent to the light at the wavelength projected onto the geometric pattern 12, 12A-12G. In further alternatives, the grooves 14, 14A-14G may be formed on an appliqué that is applied to and adhered to the surface of the structural component 10.

After the geometric pattern 12, 12A-12G is created on the structural component 10, control may pass to a block 124 where the illumination source 68 projects the light 102 with the corresponding wavelength onto the structural component 10 to illuminate the geometric pattern 12, 12A-12G. The projected light 102 is diffracted by the grooves 14, 14A-14G and corresponding colors are reflected from the geometric pattern 12, 12A-12G. The reflected light 104 may have wavelengths that vary at different locations on the geometric pattern 12, 12A-12G due to changes in the groove width WG caused by strain on the structural component 10.

With the geometric pattern 12, 12A-12G illuminated and diffracting and reflecting the light 102, control may pass to a block 126 where the reflected light 104 is detected by the detector 72 to detect reflected colors. The wavelengths of the detected light 104 may be temporarily stored or permanently stored in the memory 56.

After the reflected light 104 is detected, control may pass to a block 128 where the inspection system 50 may determine whether the last light 102 has been projected onto the geometric pattern 12, 12A-12G. As discussed above, some implementations may have a first set of grooves 14, 14A-14G with a first groove width WG that will be illuminated by a first light 102 having a first wavelength, and a second set of grooves 14, 14A-14G with a second groove width WG that will be illuminated by a second light 102 having a second wavelength. In these implementations, it may be necessary to illuminate the geometric pattern 12, 12A-12G with only one light 102 at a time. Consequently, if it is determined at the block 128 that not all lights 102 have been projected onto the geometric pattern 12, 12A-12G, control may pass back to the blocks 124, 126 to illuminate the geometric pattern 12, 12A-12G with the illumination source 68 or 70 and detect the corresponding reflected light 104 for the next light 102 as described above.

If all lights 102 have been projected and the reflected lights 104 detected at the block 128, control may pass to a block 130 where the wavelengths of the reflected lights 104 are correlated to strains in the structural component 10. As discussed above, the processor 54 may be programmed with algorithms known in the art for correlating wavelengths of reflected lights 104 into strain values. Where colors are the detectable variations in the wavelength, the processor 54 may correlate the reflected colors to the strain values.

After the strain values are determined for the reflected light 104 at the block 130, control may pass to a block 132 to determine whether any of the strain values calculated from the wavelengths of the reflected lights exceeds a predetermined minimum strain value above which further inspection or maintenance should be performed. As discussed, certain levels of strain are acceptable in the structural component 10. As an alternative, the current strain value may be compared to baseline strain values obtained for the structural component 10 before the mechanical system is placed in service and exposed to environmental conditions. A comparison may be made between the current strain values and the baseline or other previously determined strain values to determine whether the current strain values differ from the previous strain values by more than a minimum amount or percentage. If the strain values are not greater than the minimum strain value and further inspection is not otherwise required, control may pass to a block 134 where the structural component 10 is exposed to environmental conditions. The exposure may come from normal use in the normal environment of the mechanical system. Where the mechanical system is in a development stage, the environmental condition may be applied in a test environment. After the exposure at the block 134, control may pass back to the block 124 to initiate another instance of inspecting the structural component 10. Strain values being greater than the minimum strain value at the block 132 can indicate that further inspection, maintenance or replacement of the structural component 10 may be necessary. If strain values are greater than the minimum strain value at the block 132, control passes to a block 136 where to conduct further inspection of the structural component 10.

INDUSTRIAL APPLICABILITY

The inspection system 50 and the routine 120 may have broad application in assessing the structural integrity of structural components 10 in mechanical systems. For example, the inspection system 50 and the routine 120 may be used in a repair monitoring application to ensure the bond integrity or strength in a repair such as the patch 30 of FIG. 2 to the structural component 32, and the response of the patch 30 to stress and strain over time before the structural component 32 is replaced. As discussed above, the geometric pattern 12C of grooves 14C is created in the outer surface of the patch 30, either by etching or otherwise defining the grooves 14C in the surface, or by paint or an appliqué with the grooves 14C that covers the patch 30 and surrounding surface of the structural component 32. If the geometric pattern 12C is created on the patch 30 before the patch is applied to the structural component 32, strains due to bonding can be imaged and analyzed according to the routine 120 to detect residual stresses in the patch 30 and the integrity of the bond of the patch 30 to the structural component 32. A baseline image of the patch 30 before the structural component 32 with the patch 30 is exposed to environmental conditions may show any initial strain in the patch 30 and the structural component 32, and periodic imaging after the structural component 32 is exposed to the environmental conditions will monitor the integrity of the bond and the patch 30, and indicate degradation in the repair over time. The strain values derived through the inspection system 50 and the routine 120 may be input into a finite element analysis (FBA) model of the patch 30 on the structural component 32 and analyzed to provide performance assessments of the patch 30, prospective inspection schedules, and approaches to NDI and predictive maintenance and repair plans.

The inspection system 50 and the routine 120 may have application in structural testing environments. Manufacturers typically conduct subscale, mid-scale and full-scale structural testing of components and repairs to ensure proper performance in the field. Such testing can involve static and dynamic loading conditions. Several techniques are currently used in this type of structural testing. For example, strain gauges are applied to structural components as point sensors for monitoring stress and strain during the tests, but their effectiveness in detecting locations in which damage to the structural component initiates and propagates is dependent on where the strain gauges are placed on the structural component. Digital Image Correlation (DIC) may be used to provide stream mapping during structural testing, but the process can be expensive, requires expertise in operation, and necessitate spraying a speckled pattern on the surface. Consequently, DIC may be used judiciously in structural testing. The inspection system 50 and the routine 120 may be used as an alternative or a supplement to the currently-used testing techniques, and can be used to monitor and measure real-time strain patterns throughout the test loading conditions. The detected strain patterns can be used to correlate analysis models, and to point to or indicate initial failure locations in the structural component being tested. As in the repair monitoring application, direct feed of the strain information in the FEA tools can provide real-time or load-level damage growth information. The damage initiation and growth information can be used to improve the structural models of the structural components and modify the structural designs.

The inspection system 50 and the routine 120 may be used to improve the fabrication process of composite components that are becoming more prevalent in mechanical systems, and in particular in aerospace systems. During manufacturing development and periodic process monitoring and fabrication of composite components, it may be beneficial to determine and track internal strains in the composite component that are created by the fabrication of the component. The internal strains may be tracked through the use of strain indicator plies in a composite component that are configured with geometric patterns 12, 12A-12G. To create the strain indicator plies, the geometric pattern 12, 12A-12G is applied to the resin in selected plies during fabrication as an additional resin layer sprayed onto the ply that is subsequently configured with the geometric pattern 12, 12A-12G, or as an appliqué that forms a peelable ply that may be removed after the composite component is cured. The strain indicator plies will show residual stresses and strains that exist in the composite component due to the curing process. The information from the strain indicator plies can be used to modify the manufacturing process of the composite component to reduce warpage, predict performance and verify that the production process is still within specification.

The inspection system 50 and the routine 120 may also have application in monitoring the structural health of structural components disposed in limited access areas of their mechanical systems. Limited access structures on aircraft and other mechanical systems can be critical to structural integrity and can experience high loading. Structural health testing of such limited access structures may necessitate costly disassembly and reassembly processes. Strain witness surfaces in the form of the geometric patterns 12, 12A-12G of grooves 14, 14A-14G created for the limited access structures can be installed during manufacturing, or after previous damage indicates that the structure should be more closely monitored. Optical or video borescopes or small cameras and extending mechanisms can function as the illumination source 68 and detector 72 in the inspection system 50 and be used to image the geometric patterns 12, 12A-12G on the limited access structures and allow analysis of the image data to detect degradation of the components and monitor slow damage growth until a repair is needed, for example. Where access allows, the strain images can be combined with other NDI methods, such as infrared thermography, my great camera imaging or terahertz imaging, to provide an improved assessment and disposition of the limited access components. This and the foregoing applications of the inspection system 50 and the routine 120 are exemplary, and additional applications are contemplated by the inventors.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A method for assessing strain in a structural component of a mechanical system caused by exposure of the structural component to environmental conditions, comprising:
    creating a geometric pattern of grooves on the structural component having a first set of grooves each having a first groove width;
    illuminating the geometric pattern of grooves with a first projected light at a first projected wavelength that corresponds to the first groove width, wherein the first projected light is diffracted by the first set of grooves when the first projected light hits the geometric pattern of grooves and correspondingly creates a first reflected light having a first diffracted wavelength that is reflected from the geometric pattern of grooves, where changes in the first diffracted wavelength from the first projected wavelength indicate changes in the first groove width due to strain caused when the structural component is exposed to the environmental conditions;
    detecting the first diffracted wavelength of the first reflected light reflected from the geometric pattern of grooves as the first projected light illuminates the geometric pattern of grooves; and
    correlating the detected first diffracted wavelength of the first reflected light reflected from the geometric pattern of grooves to the strain in the structural component.

2. The method of claim 1, wherein the geometric pattern of grooves comprises a two-dimensional pattern having a first set of grooves spaced in a first direction and a second set of grooves spaced in a second direction that is not parallel to the first direction.

3. The method of claim 1, wherein grooves of the geometric pattern of grooves have a similar geometric shape and define increasing areas, with the grooves being arranged concentrically to form the geometric pattern of grooves.

4. The method of claim 1, wherein the geometric pattern of grooves has a second set of grooves each having a second groove width, and wherein the method comprises:
    illuminating the geometric pattern of grooves with a second projected light at a second projected wavelength that corresponds to the second groove width, wherein the second projected light is diffracted by the second set of grooves when the second projected light hits the geometric pattern of grooves and correspondingly creates a second reflected light having a second diffracted wavelength that is reflected from the geometric pattern of grooves, where changes in the second diffracted wavelength from the second projected wavelength indicate changes in the second groove width due to strain caused when the structural component is exposed to environmental conditions;
    detecting the second diffracted wavelength of the second reflected light reflected from the geometric pattern of grooves as the second projected light illuminates the geometric pattern of grooves; and
    correlating the detected second diffracted wavelength of the second reflected light reflected from the geometric pattern of grooves to the strain in the structural component.

5. The method of claim 1, wherein the first projected wavelength of the first projected light is outside a range for visible light.

6. The method of claim 1, wherein correlating the detected first diffracted wavelength of the first reflected light comprises converting the detected first diffracted wavelength of the first reflected light into strain values at corresponding locations of the structural component.

7. The method of claim 1, comprises:
    illuminating the geometric pattern of grooves with the first projected light a first time before the structural component is exposed to an environmental condition;
    detecting the first diffracted wavelength of the light first reflected from the geometric pattern of grooves as the first projected light illuminates the geometric pattern of grooves the first time;
    illuminating the geometric pattern of grooves a second time with the first projected light after the structural component is exposed to the environmental condition;
    detecting the first diffracted wavelength of the first reflected light reflected from the geometric pattern of grooves as the first projected light illuminates the geometric pattern of grooves the second time; and
    comparing the first diffracted wavelength of the first reflected light detected as the first projected light illuminates the geometric pattern of grooves the second time to the first diffracted wavelength of the first reflected light detected as the first projected light illuminates the geometric pattern of grooves the first time to determine changes in strain at corresponding locations of the structural component.

8. An inspection system for assessing strain in a structural component of a mechanical system caused by exposure of the structural component to environmental conditions, comprising:
- a geometric pattern of grooves on the structural component having a first set of grooves each having a first groove width;
- a first illumination source projecting a first projected light at a first projected wavelength that corresponds to the first groove width, wherein the first projected light is diffracted by the first set of grooves when the first projected light hits the geometric pattern of grooves and correspondingly creates a first reflected light having a first diffracted wavelength that is reflected from the geometric pattern of grooves, where changes in the first diffracted wavelength from the first projected wavelength indicate changes in the first groove width due to strain caused when the structural component is exposed to the environmental conditions;
- a detector detecting the first diffracted wavelength of the first reflected light reflected from the geometric pattern of grooves as the first illumination source illuminates the geometric pattern of grooves with the first projected light; and
- a processor operatively connected to the detector and configured to receive the detected first diffracted wavelength of the first reflected light from the detector and to correlate the detected first diffracted wavelength of the first reflected light from the geometric pattern of grooves to the strain in the structural component.

9. The inspection system of claim 8, wherein the geometric pattern of grooves comprises a two-dimensional pattern having a first set of grooves spaced in a first direction and a second set of grooves spaced in a second direction that is not parallel to the first direction.

10. The inspection system of claim 8, wherein grooves of the geometric pattern of grooves have a similar geometric shape and define increasing areas, with the grooves being arranged concentrically to form the geometric pattern of grooves.

11. The inspection system of claim 8, wherein the geometric pattern of grooves has a second set of grooves each having a second groove width, and wherein the inspection system comprises a first illumination source projecting a second projected light at a second projected wavelength that corresponds to the second groove width, wherein the second projected light is diffracted by the second set of grooves when the second projected light hits the geometric pattern of grooves and correspondingly creates a second reflected light having a second diffracted wavelength that is reflected from the geometric pattern of grooves, where changes in the second diffracted wavelength from the second projected wavelength indicate changes in the second groove width due to strain caused when the structural component is exposed to the environmental conditions.

12. The inspection system of claim 8, wherein the first projected wavelength of the first projected light is outside a range for visible light.

13. The inspection system of claim 8, comprising a layer of material covering the geometric pattern of grooves, wherein a material in the layer of material is transparent when illuminated by the first projected light having the first projected wavelength.

14. The inspection system of claim 8, comprising a portable inspection device containing the first illumination source and the detector, and transmitting the detected first diffracted wavelength of the first reflected light to the processor via wireless communications.

15. A method for assessing strain in a structural component of a mechanical system caused by exposure of the structural component to environmental conditions, the structural component having a geometric pattern of grooves on the structural component, the geometric pattern of grooves having a first set of grooves each having a first groove width, the method comprising:
- illuminating the geometric pattern of grooves with a first projected light at a first projected wavelength that corresponds to the first groove width, wherein the first projected light is diffracted by the first set of grooves when the first projected light hits the geometric pattern of grooves and correspondingly creates a first reflected light having a first diffracted wavelength that is reflected from the geometric pattern of grooves, where changes in the first diffracted wavelength from the first projected wavelength indicate changes in the first groove width due to strain caused when the structural component is exposed to the environmental conditions;
- detecting the first diffracted wavelength of the first reflected light reflected from the geometric pattern of grooves as the first projected light illuminates the geometric pattern of grooves; and
- correlating the detected first diffracted wavelength of the first reflected light reflected from the geometric pattern of grooves to the strain in the structural component.

16. The method of claim 15, wherein the geometric pattern of grooves has a second set of grooves each having a second groove width, and wherein the method comprises:
- illuminating the geometric pattern of grooves with a second projected light at a second projected wavelength that corresponds to the second groove width, wherein the second projected light is diffracted by the second set of grooves when the second projected light hits the geometric pattern of grooves and correspondingly creates a second reflected light having a second diffracted wavelength that is reflected from the geometric pattern of grooves, where changes in the second diffracted wavelength from the second projected wavelength indicate changes in the second groove width due to strain caused when the structural component is exposed to environmental conditions;
- detecting the first diffracted wavelength of the first reflected light reflected from the geometric pattern of grooves as the second projected light illuminates the geometric pattern of grooves; and
- correlating the detected first diffracted wavelength of the first reflected light reflected from the geometric pattern of grooves to the strain in the structural component.

17. The method of claim 15, wherein the first projected wavelength of the first projected light is outside a range for visible light.

18. The method of claim 15, wherein correlating the detected first diffracted wavelength of the first reflected light comprises converting the detected first diffracted wavelength of the first reflected light into strain values at corresponding locations of the structural component.

19. The method of claim 15, comprises:
- illuminating the geometric pattern of grooves with the first projected light a first time before the structural component is exposed to an environmental condition;
- detecting the first diffracted wavelength of the light first reflected from the geometric pattern of grooves as the first projected light illuminates the geometric pattern of grooves the first time;

illuminating the geometric pattern of grooves a second time with the first projected light after the structural component is exposed to the environmental condition;

detecting the first diffracted wavelength of the first reflected light reflected from the geometric pattern of grooves as the first projected light illuminates the geometric pattern of grooves the second time; and comparing the first diffracted wavelength of the first reflected light detected as the first projected light illuminates the geometric pattern of grooves the second time to the first diffracted wavelength of the first reflected light detected as the first projected light illuminates the geometric pattern of grooves the first time to determine changes in strain at corresponding locations of the structural component.

20. The method of claim 15, comprising:

performing the illuminating and detecting steps at a portable inspection device;

transmitting the detected first diffracted wavelength of the first reflected light to a remote device; and performing the correlating step at the remote device.

\* \* \* \* \*